(12) United States Patent
Lee et al.

(10) Patent No.: US 10,064,096 B2
(45) Date of Patent: Aug. 28, 2018

(54) TRAFFIC DISTRIBUTION IN HETEROGENOUS NETWORK ENVIRONMENT

(71) Applicant: KT CORPORATION, Gyeonggi-do (KR)

(72) Inventors: Hyun-Song Lee, Seoul (KR); Sung-Hoon Seo, Seoul (KR); Jai-Sop Hyun, Seoul (KR); Kyung-Ah Kim, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/526,639

(22) Filed: Oct. 29, 2014

(65) Prior Publication Data
US 2015/0117209 A1 Apr. 30, 2015

(30) Foreign Application Priority Data
Oct. 29, 2013 (KR) .................. 10-2013-0129533

(51) Int. Cl.
| | |
|---|---|
| *H04W 28/08* | (2009.01) |
| *H04W 28/02* | (2009.01) |
| *H04L 12/729* | (2013.01) |
| *H04L 12/721* | (2013.01) |
| *H04L 12/707* | (2013.01) |
| *H04L 29/08* | (2006.01) |
| *H04W 84/12* | (2009.01) |

(52) U.S. Cl.
CPC ........... *H04W 28/08* (2013.01); *H04L 45/125* (2013.01); *H04L 45/22* (2013.01); *H04L 45/70* (2013.01); *H04L 67/327* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 9,084,169 B2* | 7/2015 | Cui | ........................ | H04W 48/20 |
| 2012/0087279 A1* | 4/2012 | Rinne | .................... | H04W 48/18 |
| | | | | 370/254 |
| 2014/0153546 A1* | 6/2014 | Kim | ....................... | H04W 48/18 |
| | | | | 370/332 |

(Continued)

FOREIGN PATENT DOCUMENTS

| | | |
|---|---|---|
| KR | 10-2010-0048138 A | 5/2010 |
| KR | 10-2010-0125076 A | 11/2010 |

*Primary Examiner* — Charles C Jiang
*Assistant Examiner* — George Atkins, Jr.
(74) *Attorney, Agent, or Firm* — IP Legal Services, LLC

(57) ABSTRACT

The disclosure is related to a method for distributing data traffic of a wireless local area network (WLAN) in a WLAN access network while providing service continuity and internet protocol (IP) mobility in a heterogeneous network environment. The method may include receiving data traffic generated by user equipment and from a wireless local area network, selecting one of a first data path and a second data path for the received data traffic based on path decision information associated with the received data traffic, and transmitting the data traffic to Internet through the selected data path. The first data path may transmit the data traffic to Internet through a packet data network (PDN) gateway and the second data path may transmit the data traffic to Internet without passing through the PDN gateway.

18 Claims, 6 Drawing Sheets

(56) References Cited

U.S. PATENT DOCUMENTS

| | | | | |
|---|---|---|---|---|
| 2014/0161026 A1* | 6/2014 | Stojanovski | ............ | H04L 45/22 370/328 |
| 2014/0204745 A1* | 7/2014 | Nuss | .................... | H04W 28/08 370/232 |
| 2014/0269653 A1* | 9/2014 | Gupta | .................... | H04W 8/08 370/338 |
| 2014/0295843 A1* | 10/2014 | Van Der Velde | ..... | H04W 36/22 455/436 |
| 2014/0328177 A1* | 11/2014 | Zhao | .................... | H04W 28/08 370/235 |
| 2014/0341109 A1* | 11/2014 | Cartmell | ............... | H04L 45/308 370/328 |
| 2015/0043564 A1* | 2/2015 | Liu | .................... | H04W 76/022 370/338 |
| 2015/0098393 A1* | 4/2015 | Tofighbakhsh | ....... | H04W 24/02 370/329 |
| 2016/0066310 A1* | 3/2016 | Hashimoto | ........... | H04W 88/10 370/329 |
| 2016/0227467 A1* | 8/2016 | Tomici | .................. | H04W 48/16 |
| 2016/0374010 A1* | 12/2016 | Kim | ...................... | H04W 48/18 |

\* cited by examiner

TRAFFIC DISTRIBUTION IN HETEROGENOUS NETWORK ENVIRONMENT

CROSS REFERENCE TO PRIOR APPLICATIONS

The present application claims priority under 35 U.S.C. § 119 to Korean Patent Application No. 10-2013-0129533 (filed on Oct. 29, 2013).

BACKGROUND

The present disclosure relates to communication and, more particularly, to distributing data traffic in a trusted WLAN access network.

Seamless IP handover between heterogeneous networks has been introduced. The seamless IP handover between heterogeneous networks provides a seamless service to a subscriber through a trusted WLAN access network (TWAN) although the subscriber changes a network from a long term evolution (LTE) network to a WiFi network or from a WiFi network to a LTE network while downloading and watching a movie through user equipment, such as a smart phone. That is, the seamless IP handover provides IP mobility and service continuity through the TWAN. The TWAN transmits all of data traffic through a packet data network gateway (PDN gateway) to Internet. Such requirement might deteriorate overall network performance when a PDN gateway has a high traffic load.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a data traffic of a wireless local area network (WLAN) may be delivered directly to an Internet while maintaining service continuity and Internet protocol (IP) mobility.

In accordance with another aspect of the present invention, data traffic in a trusted WLAN access network may be distributed based on traffic information, subscriber information, network information, and predetermined policies.

In accordance with still another aspect of the present invention, a data path of WLAN data traffic generated by user equipment may be decided based traffic information, network information, subscriber information, and predetermined policies.

In accordance with at least one embodiment, a method may be provided for distributing data traffic of a wireless local area network (WLAN) in a WLAN access network while providing service continuity and internet protocol (IP) mobility in a heterogeneous network environment. The method may include receiving data traffic generated by user equipment and from a wireless local area network, selecting one of a first data path and a second data path for the received data traffic based on path decision information associated with the received data traffic, and transmitting the data traffic to Internet through the selected data path. The first data path may transmit the data traffic to Internet through a packet data network (PDN) gateway and the second data path may transmit the data traffic to Internet without passing through the PDN gateway.

The method may further include obtaining traffic information of the received data traffic, subscriber information of the user equipment, network information of entities in an associated mobile network, and a path decision policy and storing the traffic information, the subscriber information, the network information, and the path decision policy, as the path decision information.

The method may further include obtaining a path decision policy from at least one of entities of an associated mobile network. The path decision policy may include at least one of: a policy rule to select one of the first data path and the second data path based on an application or a service generating the received WLAN data traffic from the user equipment; a policy rule to select one of the first data path and the second data path based on a network load status of the first path; a policy rule to select one of the first data path and the second data path based on subscriber information of the user equipment; a policy rule to select one of the first data path and the second data path differently by a subscribing time; and a policy rule to apply at least one of a priority and a weight each path decision policy rule based on a subscribing time, a traffic generation region, a subscriber, a traffic type, and a load.

The method may further include obtaining a load status of the PDN gateway as the network information. In this case, the selecting may include selecting the second data path when the obtained load status of the PDN gateway is greater than a predetermined load level and selecting the first data path when the obtained load status of the PDN gateway is not greater than a predetermined load level.

The method may further include obtaining traffic information from the received data traffic, comparing the obtained traffic information with information stored in a mapping table, and storing the comparison result as the path decision information. In this case, the obtaining traffic information may include extracting information on a source address, a destination address, a protocol, a source port, a destination port, and at least one of an application and a service executed in the user equipment and generating the received data traffic from the received data traffic, as the traffic information. The selecting one of a first data path and a second data path may include comparing the extracted information with information of path decision policy rules stored in a mapping table, determining a data path mapped to information of the mapping table, which is matched with the extracted information, and selecting one of the first data path and the second data path based on the determined data path.

The method may further include obtaining information on at least one of an application and a service executed in the user equipment and generating the received data traffic from the received data traffic. In this case, the selecting one of a first data path and a second data path may include selecting the first data path to transmit the received data traffic when the at least one of the application and the service generating the received data traffic is provided by an associated service provider that provides a mobile communication service through the PDN gateway; otherwise, selecting the second data path to transmit the data traffic.

The method may further include receiving a request to access to the wireless local area network from the user equipment, receiving subscriber information from an authentication server, and transmitting an IP address allocated by the PDN gateway to the user equipment for the data traffic of the wireless local area network. In this case, the receiving subscriber information may include requesting the authentication server to perform an authentication procedure to authenticate the user equipment and receiving an authentication result with the subscriber information from the authentication server in response to the requesting. The transmitting an IP address may include requesting the PDN gateway to allocate an IP address for the user equipment upon the receipt of the request to access and receiving the IP address allocated to the user equipment from the PDN gateway.

In accordance with another embodiment, a method may be provided for changing a data path of transmitting data traffic of a wireless local area network (WLAN) to Internet in a WLAN access network while providing service continuity and internet protocol (IP) mobility in a heterogeneous network environment. The method may include selecting one of a first data path and a second data path for data traffic generated by user equipment and received from a wireless local area network, based on path decision information associated with the received data traffic, transmitting the data traffic to Internet through the selected data path, and changing the selected data path to the other based on regularly updated path decision information.

The first data path may transmit the data traffic to Internet through a packet data network (PDN) gateway and the second data path may transmit the data traffic to Internet without passing through the PDN gateway.

The method may further include monitoring a load status of the selected data path at a predetermined interval while transmitting the data traffic through the selected data path and changing the selected data path to the other when the monitored load stat of the selected data path is greater than a predetermined level.

The method may further include monitoring a load status of the PDN gateway at a predetermined interval while transmitting the data traffic through the first data path and changing the first data path to the second data path when the monitored load stat of the PDN gateway is greater than a predetermined level.

In accordance with still another embodiment, an apparatus may be provided for distributing data traffic of a wireless local area network (WLAN) in a WLAN access network while providing service continuity and internet protocol (IP) mobility in a heterogeneous network environment. The apparatus may be configured to receive data traffic generated by user equipment and from a wireless local area network, to select one of a first data path and a second data path for the received data traffic based on path decision information associated with the received data traffic, and to transmit the data traffic to Internet through the determined data path.

The first data path may transmit the data traffic to Internet through a packet data network (PDN) gateway and the second data path may transmit the data traffic to Internet without passing through the PDN gateway.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
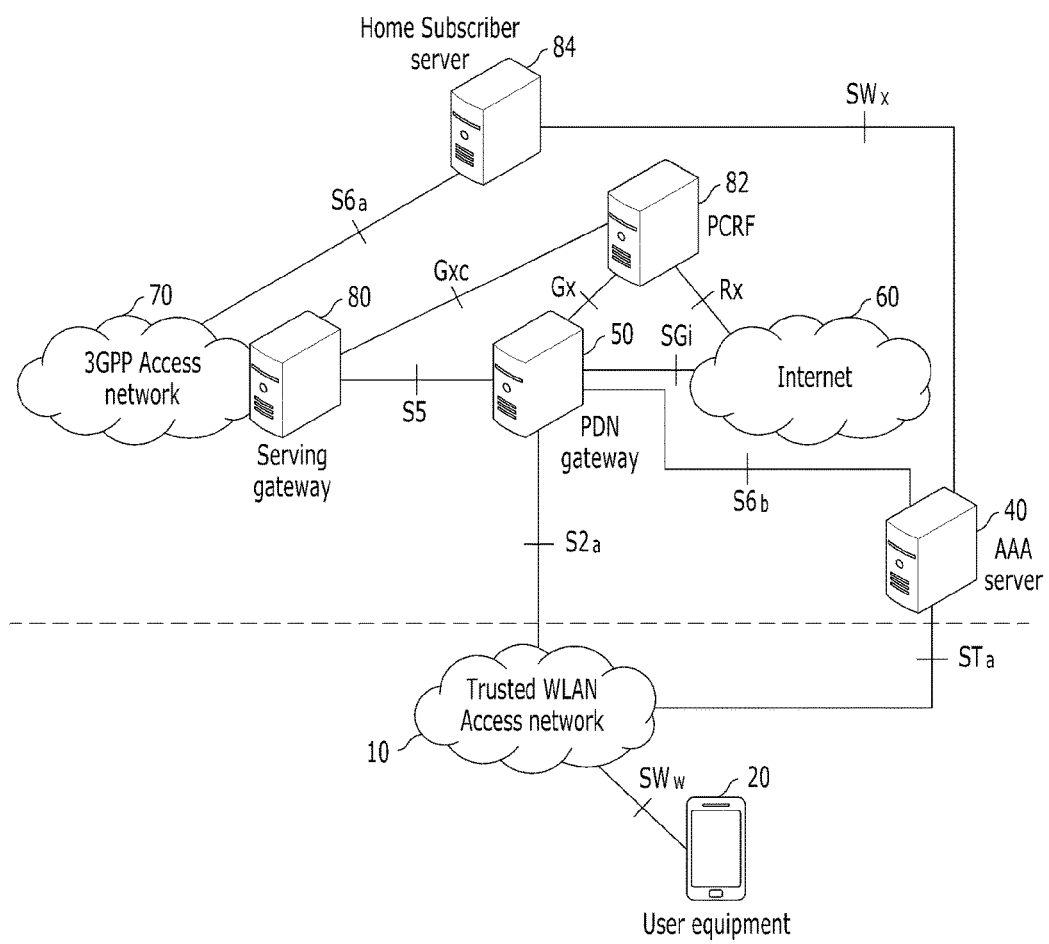
FIG. 1 illustrates a network architecture for providing service continuity and Internet protocol (IP) mobility between heterogeneous wireless networks.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, data traffic of a wireless local area network (WLAN) may be transmitted directly to Internet or passing through a packet data network (PDN) gateway based on traffic information, subscriber information, network information, and predetermined policies associated with the data traffic. In particular, a distributor may be included in a trusted WLAN access network coupled between a wireless local area network (e.g., a non-3GPP network) and a mobile communication network (e.g., a 3GPP network). The distributor may receive data traffic generated by user equipment served by a wireless local area network through an access point, determines a data path of the received data traffic based on traffic information, subscriber information, network information, and predetermined policies, and delivers the received data traffic to Internet through the determined data path. Such a distribution operation will be described hereinafter.

FIG. 1 illustrates a network architecture for providing service continuity and Internet protocol (IP) mobility between heterogeneous wireless networks.

Referring to FIG. 1, a heterogeneous network environment may include two different communication networks, such as a 3$^{rd}$ generation partnership project (3GPP) network and a non-3GPP network. For example, the 3GPP network may include networks employing technologies such as general packet radio service (GPRS), universal mobile telecommunication system (UMTS), Enhanced data rates for GSM evolution (EDGE), high speed packet access (HSPA), long term evolution (LTE), and LTE advanced. The non-3GPP network may include networks employing technologies such as code division multiple access (CDMA) 2000 and WiFi.

In order to provide such service continuity and IP mobility between heterogeneous networks, trusted wireless local area network access network (TWAN) 10 is coupled between an evolved packet core (EPC) and user equipment 20. In particular, TWAN 10 is coupled to packet data network (PDN) gateway 50 of the EPC. TWAN 10 may connect a wireless local area network (WLAN) of user equipment 20 to PDN gateway 50 and AAA server 40. AAA server 40 may perform an authentication procedure to authenticate user equipment 20. TWAN 10 is coupled to user equipment 20 through interface $SW_w$, and TWAN 10 is coupled to PDN gateway 50 through interface $S2_a$. Furthermore, the EPC may include serving gateway 80 for routing and forwarding user data packets, policy and charging rules function (PCRF) 82 for determining associated policy rules, and home subscriber server (HSS) 84 for containing user-related and subscription-related information.

When user equipment 20 accesses TWAN 10 through an access point (AP), TWAN 10 may perform an authentication procedure to authenticate user equipment 20 in cooperation with AAA server 40. After the authentication procedure, PDN gateway 50 allocates an IP address to user equipment 20. With the allocated IP address, user equipment 20 communicates with other entities in Internet 60. That is, the WLAN data traffic of user equipment 20 is delivered in order of access point, Trusted WLAN access network 10, PDN gateway 50, and Internet 60.

As described, TWAN 10 enables user equipment 20 to use a typical IP address structure of a mobile network, such as a wideband code division multiple accesses (WCDMA), global system for mobile communications (GSM), or long term evolution (LTE) although user equipment 20 is coupled to a wireless local area network (WLAN). However, all of WLAN data traffic of user equipment 20 has to pass through PDN gateway 50 to reach Internet 60.

Figure 2:
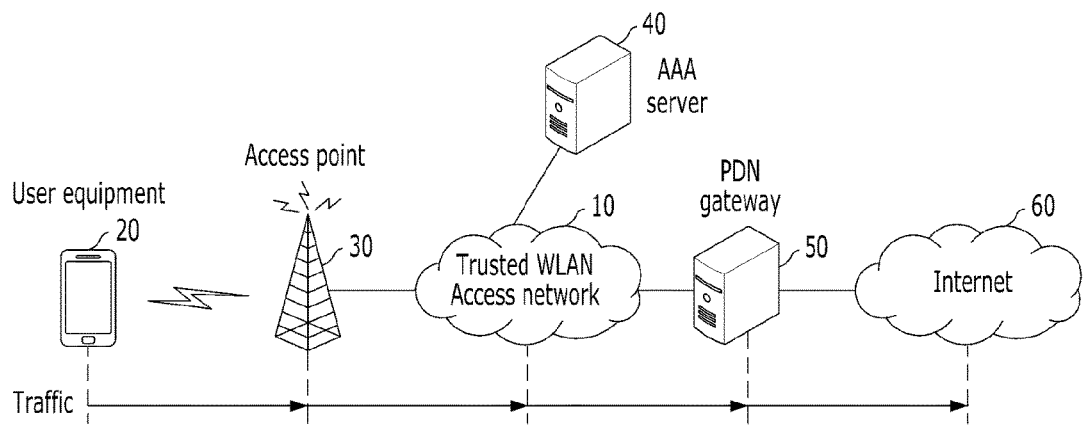
FIG. 2 illustrates a typical data traffic path of WLAN data traffic in a trusted WLAN access network.

FIG. 2 illustrates a typical data traffic path of delivering WLAN data traffic to Internet in a trusted WLAN access network.

Referring to FIG. 2, user equipment 20 generates WLAN data traffic and transmits the generated WLAN data traffic to Internet 60 through trusted WLAN access network 10 in order to provide IP mobility and service continuity. That is, a data traffic path of the WLAN data traffic of user equipment 20 is formed in order of: access point 30, trusted WLAN access network 10, PDN gateway 50, and Internet.

For example, trusted WLAN access network 10 may connect AP 30 and Internet 60 through PDN gateway 50. Such trusted WLAN access network 10 supports seamless IP handover between heterogeneous networks and enables user equipment 20 to perform data communication. That is, trusted WLAN access network 10 delivers data traffic generated by user equipment 20 coupled to a WLAN such as a WiFi network. Trusted WLAN access network 10 may provide a typical IP address of a mobile communication network to data traffic of the WLAN, which is referred to as WLAN data traffic. Access network 10 is illustrated and described as a trusted WLAN access network, but the present invention is not limited thereto. That is, access network 10 may be a non-trusted WLAN access network.

For example, when user equipment 20 accesses a non-3GPP network (e.g., a WiFi network), user equipment 20 may perform an authentication procedure in cooperation with AAA server 40 through WLAN access network 10. After the authentication, user equipment 20 is allocated with an IP address from PDN gateway 50 through WLAN access network 10. That is, although user equipment 20 accesses the wireless local area network, WLAN access network 10 enables user equipment 20 to use a typical IP address structure of a mobile communication network. Accordingly, IP mobility and service continuity are provided. However, all of WLAN data traffic generated by user equipment 20 has to be delivered through PDN gateway 50, as shown in FIG. 2.

Figure 3:
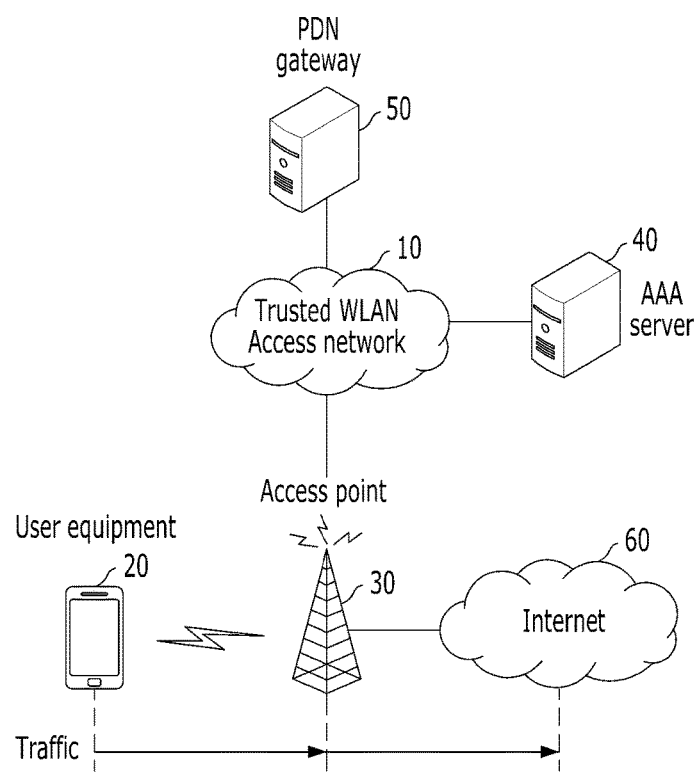
FIG. 3 illustrates a typical data traffic path of delivering WLAN data traffic to Internet with non-seamless WLAN offload applied.

FIG. 3 illustrates a typical data traffic path of delivering WLAN data traffic to Internet with non-seamless WLAN offload applied.

As shown in FIG. 3, access point 30 may transmit the WLAN data traffic of user equipment 20 directly to Internet 60 in steady of transmitting the WLAN data traffic of user equipment 20 to Internet 60 through PDN gateway 50. Such technology may be referred to as non-seamless WLAN offload (NSWO). In such NSWO, the WLAN data traffic of user equipment 20 is transferred from AP 30 directly to Internet 60 without passing through trusted WLAN access network 10. Accordingly, IP mobility and service continuity are not guaranteed.

In the NSWO, the data path of the WLAN data traffic may be decided by AAA server 40 when AAA server 40 performs an authentication procedure. That is, AAA server 40 determines a data path for the WLAN data traffic of user equipment 20 based on subscriber information. When subscriber information of user equipment 20 indicates that user equipment 20 requests an IP mobility service, AAA server 40 decides the data traffic path of FIG. 2. When subscriber information of user equipment 20 indicates that user equipment 20 does not request the IP mobility service (e.g., a non-IP mobility service), AAA server 40 decides the data traffic path of FIG. 3.

The IP mobility requires IP handover between heterogeneous networks. In order to support such an IP mobile service, user equipment needs to be allocated with an IP address from PDN gateway 50 through trusted WLAN access network 10. The non-IP mobility does not require IP handover between heterogeneous networks. In this case, user equipment can be allocated with an IP from an access point or a DHCP server and coupled to Internet 60.

As described, the NSWO does not consider various factors related to network status of a data path and a load status of related network entities such as PDN gateway 50. Furthermore, such a typical method of deciding a data path of WLAN data traffic is not customized by service policies and service properties of a service provider.

Figure 4:
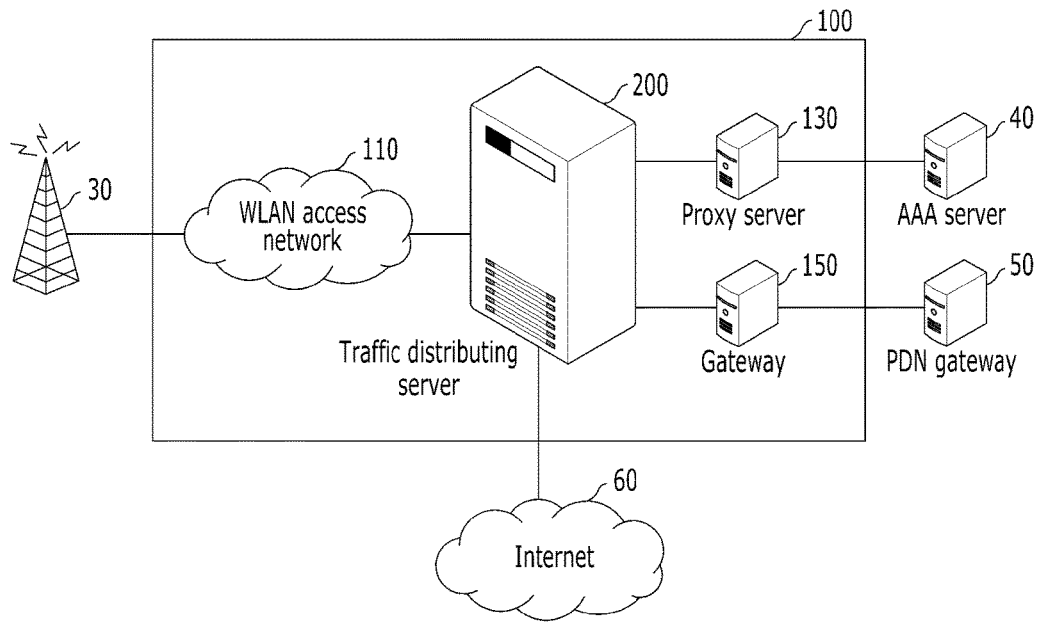
FIG. 4 illustrates distributing WLAN data traffic in a trusted WLNA access network in accordance with at least one embodiment.
Figure 5:
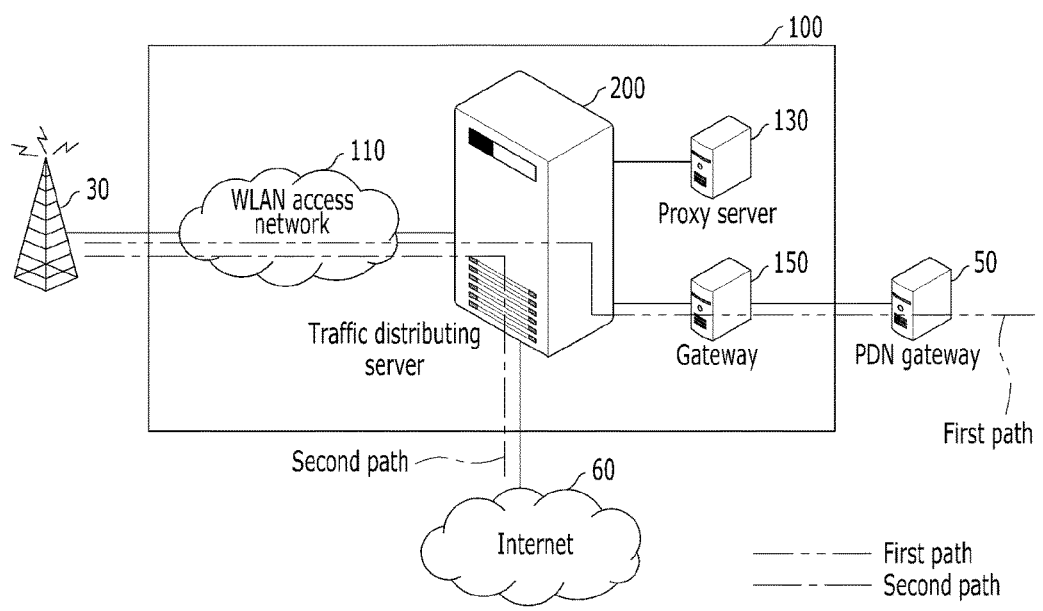
FIG. 5 illustrates a data traffic path formed by a distributor of FIG. 4 in accordance with at least one embodiment.

FIG. 4 illustrates a distributor of distributing WLAN data traffic in a trusted WLAN access network in accordance with at least one embodiment. FIG. 5 illustrates a data traffic path formed by a distributor of FIG. 4 in accordance with at least one embodiment.

Referring to FIG. 4, distributor 200 is included in trusted WLAN access network 100 coupled between a wireless local area network (e.g., a non-3GPP network) and a mobile communication network (e.g., a 3GPP network) in accordance with at least one embodiment. Distributor 200 receives data traffic from a wireless local area network of user equipment 20 through access point 30, determines a data path of the received data traffic based on traffic information, subscriber information, network information, and predetermined policies, and delivers the received data traffic to Internet 60 through the determined data path.

In particular, trusted WLAN access network 100 may include WLAN access network 110, distributor 200, proxy server 130, and gateway 150 in accordance with at least one embodiment.

WLAN access network 110 may be coupled to access point 30. WLAN access network 110 may receive data traffic (e.g., WLAN data traffic) from access point 30 and pass the received data traffic to distributor 200, or receive data traffic from distributor 200 and transmit the data traffic to access point 30.

Proxy server 130 may be coupled to AAA server 40 of a 3GPP network and request AAA server 40 to authenticate user equipment 20. Proxy server 130 may receive an authentication result message from AAA server 40. Proxy server 130 may be a trusted WLAN AAA proxy server (TWAP) of AAA server 40.

Gateway 150 may be coupled to PDN gateway 50 of a 3GPP network. Gateway 150 may be a trusted WLAN access gateway (TWAG). In particular, gateway 150 provides IP mobility by allocating an IP address of user equipment 20 in cooperation with PDN gateway 50. In addition, gateway 150 may receive WLAN data traffic from distributor 200 and transmit the WLAN data traffic to PDN gateway 50 when distributor 200 decides a second path as the data traffic path of the WLAN data traffic.

Distributor 200 may perform an authentication procedure with AAA server 40 through proxy server 130. After authentication, distributor 200 provides an IP address allocated from PDN gateway 50 to user equipment 200 through gateway 150.

Based on path decision information, distributor 200 may decide a traffic path to distribute WLAN data traffic received from user equipment 20 through access point 30 in accordance with at least one embodiment. In particular, distributor 200 may select one of a first data path and a second data path based on the path decision information. As shown in FIG. 5, the first data path is formed in order of distributor 200, gateway 150, PDN gateway 50, and Internet 60, and the second path is formed in order of distributor 200 and Internet 60. That is, when the second data path is selected, WLAN data traffic of user equipment 20 is transmitted directly to Internet 60 without passing through a mobile network (e.g., 3GPP network).

The path decision information may include at least one of i) traffic information, ii) subscriber information, iii) network information, and iv) path decision policy. The traffic information may denote information on WLAN data traffic generated by user equipment 20.

Such traffic information may include information on 5-tuple of the WLAN data traffic from user equipment 20 and an application or a service associated with the WLAN data traffic from user equipment 20. The 5-tuple of the WLAN data traffic includes a source address, a destination address, a protocol, a source port number, and a destination port number of the WLAN data traffic. The application or the service associated with the WLAN data traffic may be information on an application or a service executed in user equipment 20 to generate and transmit the WLAN data traffic. For example, an application or a service associated with the WLAN data traffic may include a chatting application such as a messenger, a video call service, a voice call service, a moving image service, and an Internet portal service.

The subscriber information may be information on a subscriber and an associated service plan. For example, the subscriber information may include information on a subscriber (e.g., identification), a service level (e.g., QoS level), a service plan (e.g., whether to request an IP mobility or not), and so forth.

The network information may be information on load statuses of associated network entities. For example, the network information may include information on a load status of PDN gateway 50.

The path decision policy may be defined by at least one of a service provider, an operator, and a related standard organization. The path decision policy may include various policy rules to select a data path from predetermined data paths (e.g., the first data path and the second data path) in order to distribute the WLAN data traffic of user equipment 20. Such a path decision policy may be applied in consideration of traffic information, subscriber information, and network information.

A service provider may define a path decision policy to select the first path when the WLAN data traffic is associated with an application or a service provided by the service provider. Otherwise, the path decision policy is defined to select the second path. A service provider may define a path decision policy to assign a predetermined data path to a respective subscriber. For example, when a subscriber's service level is higher than a predetermined level and/or when a subscriber's service plan includes an IP mobility service, a service provider sets a data path of WLAN data traffic as the first path. A service provider may define a path decision policy to select one of the first path and the second path for WLAN data traffic based on a network load status of the first path.

In accordance with at least one embodiment, distributor 200 delivers the WLAN data traffic from user equipment 20 to gateway 150 when distributor 200 selects the first data path based on the path decision information. In addition, distributor 200 delivers the WLAN data traffic from user equipment directly to Internet 60 when distributor 200 selects the second data path based on the path decision information.

In accordance with another embodiment, distributor 200 may change a data path from the first path to the second path or from the second path to the first path while transmitting WLAN data traffic of user equipment 20 through one of the first path and the second path. Typically, in order to change such a data path, an AAA server needs to change a subscriber's properties and user equipment must reestablish a call setup. However, distributor 200 may dynamically change a data path of WLAN data traffic without requiring changing of the subscriber's properties or reestablishing of a call setup.

As described, distributor 200 may dynamically decide and change a data path of WLAN data traffic in consideration of a type of the WLAN data traffic, a network status, a subscribing type, and a path decision policy (e.g., requirement of a service provider) in a heterogeneous network environment where a LTE network, a WCDMA network, and a WiFi network coexist. Furthermore, although distributor 200 selects the second data path (e.g., directly to Internet 60) to deliver the WLAN data traffic of user equipment 20, the IP mobility can maintain in such a heterogeneous network environment because an IP address is allocated to user equipment 20 for the WLAN data traffic by PDN gateway 50. Hereinafter, such distributor 200 and an operation thereof will be described in detail with reference to FIG. 6 and FIG. 7.

Figure 6:
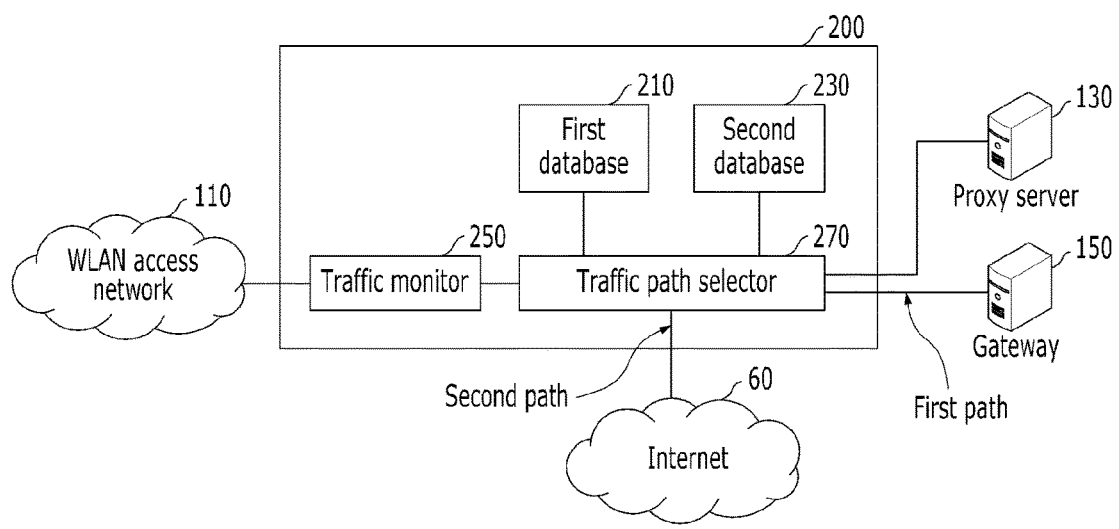
FIG. 6 illustrates a distributer in accordance with at least one embodiment.
Figure 7:
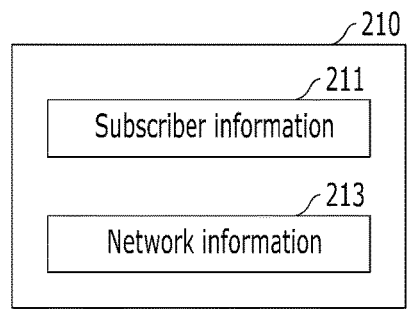
FIG. 7 illustrates distribution information stored in a distributer in accordance with at least one embodiment.

FIG. 6 is a block diagram illustrating a distributer in accordance with at least one embodiment. FIG. 7 illustrates distribution information stored in a distributer in accordance with at least one embodiment.

Referring to FIG. 6 and FIG. 7, distributor 200 may include first database 210, second database 230, traffic monitor 250, and traffic path selector 270. First database 210 may store information for selecting a data path in accordance with at least one embodiment. Such information are used by traffic path selector 270 to select a data path of WLAN data traffic received from user equipment 20 through WLAN access network 110.

As shown in FIG. 7, first database 210 may store subscriber information 211 and network information 213. Subscriber information 211 may include various types of subscriber information of each subscriber. Such subscriber information 211 may be obtained from AAA server 40. The subscriber information may be information on a subscriber and an associated service plan. For example, the subscriber information may include information on a subscriber (e.g., identification), a service level (e.g., QoS level), a service plan (e.g., whether to request an IP mobility or not), and so forth.

Network information 213 may be information on load statuses of associated network entities. For example, the network information may include information on a load status of PDN gateway 50. Traffic path selector 270 may decide or change a data path when one of the network entities has a load status greater than a predetermined level based on network information 213.

Second database 230 may include information on a path decision policy to select a data path for WLAN data traffic from user equipment 20. Such a path decision policy may be obtained from a subscriber management system including HSS 84, AAA server 40, and PCRF 82. Alternatively, distributor 200 may obtain the path decision policy from at least one of an operator, a service provider, a system designer, and a related standard organization.

The path decision policy may include various policy rules defined based on a traffic type, a network load, a subscribing type, a traffic generation region, and so forth. The path decision policy may also include a method of distributing WLAN data traffic according to the policy rule.

For example, when the path decision policy is defined to select one of a first data path (e.g., distributor 200, PDN gateway 50, and Internet 60) and a second data path (e.g., distributor 200 directly to Internet 60) based on the path decision information, the policy rules may be defined as follows. i) The path decision policy includes a policy rule to select one of a first data path and a second data path based on an application or a service associated with WLAN data traffic from user equipment 20. ii) The path decision policy includes a policy rule to select one of the first data path and the second data path based on a network load status of the first path. iii) The path decision policy includes a policy rule to select one of the first data path and the second data path based on subscriber information. iv) The path decision policy includes a policy rule to select one of the first data path and the second data path differently by a subscribing time. Furthermore, a priority or a weight may be applied to each path decision policy rule based on a subscribing time, a traffic generation region, a subscriber, a traffic type, and a load.

Traffic monitor 250 analyzes WLAN data traffic received from user equipment 20. For example, traffic monitor 250 may determine 5 tuples of the received WLAN data traffic and an application or a service associated with the received WLAN data traffic based on the analysis result.

Traffic path selector 270 may decide a data path of the received WLAN data traffic based on the traffic information determined by traffic monitor 250, subscriber information and network information stored in first database 210, and based on path decision policy stored in second database 230.

Traffic path selector 270 delivers the received WLAN data traffic to gateway 150 when traffic path selector 270 selects the first data path. Traffic path decision processor 270 delivers the received WLAN data traffic directly to Internet network 60 when traffic path selector 270 selects the second traffic path.

As described, the path decision policy includes a policy rule to select a data path based on an application or a service associated with WLAN data traffic to deliver. Hereinafter, a method for deciding a data path of WLAN data traffic based on an application or a service associated with the WLAN data traffic will be described.

For example, second database 230 stores a policy rule to select the first data path when WLAN data traffic is generated by an application or a service that a service provider of user equipment 20 provides directly to a subscriber and to select the second data path when WLAN data traffic is generated by an application or a service not associated with the service provider. For example, when a 3GPP service provider of user equipment 20 provides a messenger service, a video call service, or a multimedia service, the first data path is selected for WLAN data traffic generated by at least one of the messenger service, the video call service, or the multimedia servicer. Furthermore, when WLAN data traffic is generated by an application or a service of a third party, such as YouTube, Whatsup messenger, and so forth, the second data path is selected. Accordingly, such applications or services and assigned data paths may be stored in a form of a mapping table in second database 230. Table 1 below shows an example of the mapping table stored in second database 230.

TABLE 1

| Data path to select | Application or service | Destination address | Protocol | Destination port No. |
|---|---|---|---|---|
| First data path | Messenger service | 10.10.10.1 | 6 | 80 |
|  | Video call service | 10.10.10.2 | 6 | 80 |
|  | Multimedia service | 10.10.10.3 | 6 | 80 |
| Second data path | YouTube | 10.10.10.4 | 5 | 79 |

For example, when user equipment 20 requests a predetermined move as a multimedia service, traffic monitor 250 obtains traffic information from WLAN data traffic received from user equipment 20. The obtained traffic information includes an IP address of user equipment 20 as a source address, 10.10.10. 3 as a destination address, 6 as a protocol, and 80 as destination port number.

Traffic path selector 270 compares the obtained traffic information with information in the mapping table (e.g., table 1) stored in second database 230. Based on the comparison result, traffic path select 270 selects the first data path for the WLAN data traffic.

For another example, when user equipment 20 executes a YouTube application and requests a predetermined move, traffic monitor 250 obtains traffic information from WLAN data traffic received from user equipment 20. The obtained traffic information includes an IP address of user equipment 20 as a source address, 10.10.10. 4 as a destination address, 5 as a protocol, and 79 as destination port number.

Traffic path selector 270 compares the obtained traffic information with information in the mapping table (e.g., table 1) stored in second database 230. Based on the comparison result, traffic path select 270 selects the second data path for the WLAN data traffic.

In addition, traffic path selector 270 may change a data path of WLAN data traffic from the first data path to the second data path or from the second data path to the first data path based on a load status of a predetermined entity, such as PDN gateway 50. For example, when WLAN data traffic is transmitted through the first data path (e.g., through PDN gateway 50), a traffic load status of PDN gateway 50 might abruptly increase. In this case, such a traffic load status may be detected and updated at first database 210 and informed to traffic path selector 270. Based on such information, traffic path selector 270 may change the data path of the WLAN data traffic from the first data path to the second data path.

Figure 8:
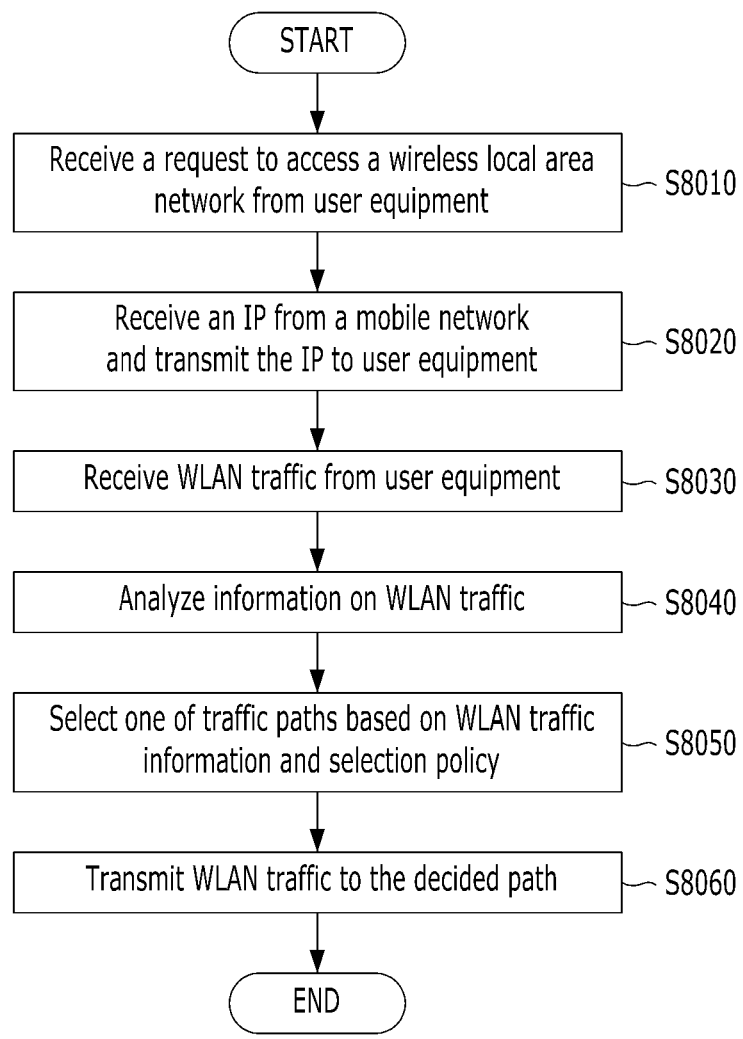
FIG. 8 illustrates a method of distributing data traffic in a heterogeneous network environment in accordance with at least one embodiment.

FIG. 8 illustrates a method of distributing data traffic in a heterogeneous network environment in accordance with at least one embodiment.

Referring to FIG. 8, WLAN access network 100 may receive a request from user equipment 20 to access WLAN access network 100 at step S8010. In response to the request, WLAN access network 100 may authenticate user equipment 20 in connection with AAA server 40. After authentication, an IP address is allocated to user equipment by PDN gateway 50. That is, WLAN access network 100 transmits the allocated IP address from PDN gateway 50 to user equipment 20 after the authentication procedure performed with AAA server 40 at step S8020, When WLAN access network 100 receives WLAN data traffic from user equipment 20 at step S8030, distributor 200 obtains and analyzes traffic information on the received WLAN data traffic from user equipment 200 at step S8040. Distributor 200 selects one of the first data path and the second data path based on the obtained traffic information, subscriber information, network information, and a path decision policy at step S8050. Distributor 200 transmits the received WLAN data traffic to selected data path at step S8060.

Figure 9:
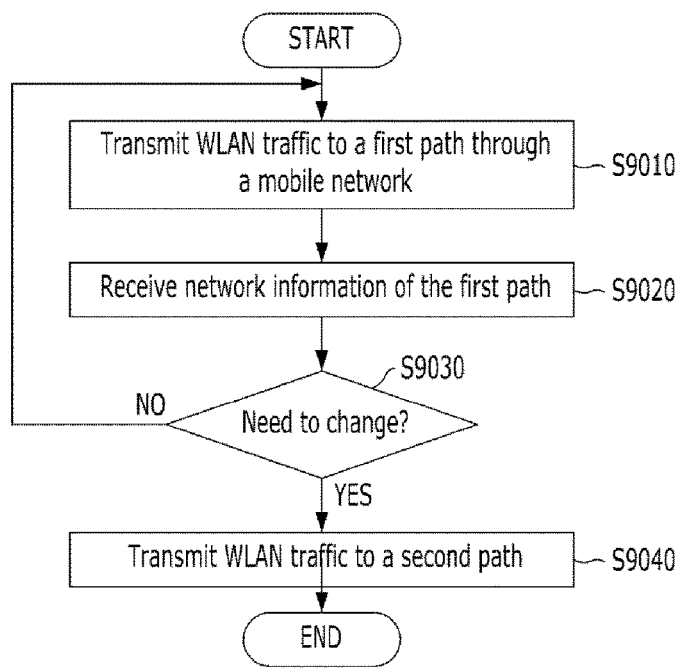
FIG. 9 illustrates a method of dynamically changing a data path of WLAN data traffic according to network information in accordance with another embodiment.

FIG. 9 illustrates a method of dynamically changing a data path of WLAN data traffic according to network information in accordance with another embodiment.

Referring to FIG. 9, distributor 200 may transmit WLAN data traffic of user equipment 20 through a first data path at step S9010. While transmitting the WLAN data traffic of user equipment 20, distributor 200 may regularly receive network information of the first data path at step S9020. Based on the network information, distributor 200 may analyze a network status of the first data path and determine to change the data path of WLAN data traffic from the first data path to a second data path based on the analysis result at step S9030.

When it is necessary to change (Yes—S9030), distributor 200 may change the first data path to the second data path and transmit the WLAN data traffic of user equipment 20 through the second path at step S9040. When it is not necessary to change (No—S9030), distributor 200 may continuously transmit the WLAN data traffic of user equipment 20 through the first data path.

Figure 10:
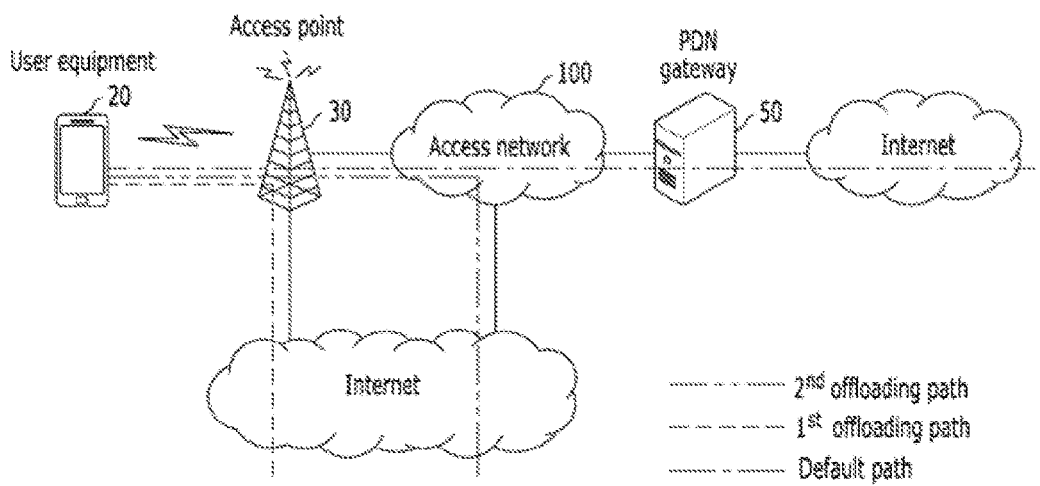
FIG. 10 illustrates distributing WLAN data traffic of user equipment in a heterogeneous network environment with non-seamless WLAN offload technology applied in accordance with at least one embodiment.

FIG. 10 illustrates distributing WLAN data traffic of user equipment in a heterogeneous network environment with non-seamless WLAN offload technology applied in accordance with at least one embodiment.

Referring to FIG. 10, some of WLAN data traffic generated by user equipment 20 may be transmitted directly to Internet 60 from access point 30 based on non-seamless WLAN offload (NSWO). In this case, a data path of WLAN data traffic is formed through $1^{st}$ offloading path, as shown in FIG. 10.

Furthermore, other WLAN data traffic generated by user equipment 20 may be transmitted to distributor 200 in access network 100 through access point 30. Distributor 200 may decide a data path of the WLAN data traffic based on at least one of traffic information, network information, subscriber information, and a path decision policy in accordance with at least one embodiment. That is, the WLAN data traffic may be transmitted to PDN gateway 50 and to Internet through a default path. Alternatively, the WLAN data traffic may be transmitted directly to Internet from access network 100 through a $2^{nd}$ offloading path, as shown in FIG. 10.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

In the specification, user equipment may be referred to as at least one of a mobile station (MS), a mobile terminal (MT), a subscriber station (SS), a portable subscriber station (PSS), an access terminal (AT), Use equipment may include at least one or entire of functions of a MS, a MT, a SS, a PSS, and an AT. In addition, a base station (BS) may be referred to as an access point (AP), a radio access station (RAS), a node b (NodeB), an evolved NodeB (eNodeB), a base transceiver station (BTS), a mobile multihop relay (MMR)-BS. A base station may include at least one or entire of functions of an AP, a RAS, a NodeB, an eNodeB, a BTS, and a MMR-BS.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of distributing, by a traffic distributing server, data traffic of a wireless local area network (WLAN) in a WLAN access network while providing service continuity and internet protocol (IP) mobility in a heterogeneous network environment, the method comprising:
    receiving by the traffic distributing server, data traffic generated by a user equipment and from a wireless local area network;
    obtaining, by the traffic distributing server, a path decision policy from at least one of entities of an associated mobile network;
    selecting, by the traffic distributing server, one of a first data path and a second data path for the received data traffic based on path decision information associated with the received data traffic and the obtained path decision policy; and
    transmitting, by the traffic distributing server, the data traffic to Internet through the selected data path,
    wherein the first data path transmits the data traffic to Internet through a packet data network (PDN) gateway and the second data path transmits the data traffic to Internet without passing through the PDN gateway, and
    wherein the path decision policy includes:
    a policy rule to select one of the first data path and the second data path based on an application or a service generating the received WLAN data traffic from the user equipment;
    a policy rule to select one of the first data path and the second data path based on a network load status of the first path;
    a policy rule to select one of the first data path and the second data path based on subscriber information of the user equipment;
    a policy rule to select one of the first data path and the second data path differently by a subscribing time; and
    a policy rule to apply at least one of a priority and a weight for each path decision policy rule based on a subscribing time, a traffic generation region, a subscriber, a traffic type, and a load.

2. The method of claim 1, comprising:
    obtaining traffic information of the received data traffic, subscriber information of the user equipment, network information of entities in an associated mobile network, and a path decision policy; and
    storing the traffic information, the subscriber information, the network information, and the path decision policy, as the path decision information.

3. The method of claim 1, comprising:
    obtaining a load status of the PDN gateway as the network information,
    wherein the selecting comprises:
    selecting the second data path when the obtained load status of the PDN gateway is greater than a predetermined load level; and
    selecting the first data path when the obtained load status of the PDN gateway is not greater than a predetermined load level.

4. The method of claim 1, comprising:
    obtaining traffic information from the received data traffic;
    comparing the obtained traffic information with information stored in a mapping table; and
    storing the comparison result as the path decision information.

5. The method of claim 4, wherein the obtaining traffic information comprises:
    extracting information on a source address, a destination address, a protocol, a source port, a destination port, and at least one of an application and a service executed in the user equipment from the received data traffic, as the traffic information.

6. The method of claim 5, wherein the selecting one of a first data path and a second data path comprises:
    comparing the extracted information with information of path decision policy rules stored in a mapping table;
    determining a data path mapped to information of the mapping table, which is matched with the extracted information; and selecting one of the first data path and the second data path based on the determined data path.

7. The method of claim 1, comprising:
obtaining information on at least one of an application and a service executed in the user equipment from the received data traffic,
wherein the selecting one of a first data path and a second data path comprises:
selecting the first data path to transmit the received data traffic when the at least one of the application and the service generating the received data traffic is provided by an associated service provider that provides a mobile communication service through the PDN gateway;
otherwise, selecting the second data path to transmit the data traffic.

8. The method of claim 1, comprising:
receiving a request to access to the wireless local area network from the user equipment;
receiving subscriber information from an authentication server; and
transmitting an IP address allocated by the PDN gateway to the user equipment for the data traffic of the wireless local area network.

9. The method of claim 8, wherein the receiving subscriber information comprises:
requesting the authentication server to perform an authentication procedure to authenticate the user equipment; and
receiving an authentication result with the subscriber information from the authentication server in response to the requesting.

10. The method of claim 8, wherein the transmitting an IP address comprises:
requesting the PDN gateway to allocate an IP address for the user equipment upon the receipt of the request to access; and
receiving the IP address allocated to the user equipment from the PDN gateway.

11. A method of changing, by a traffic distributing server, a data path of transmitting data traffic of a wireless local area network (WLAN) to Internet in a WLAN access network while providing service continuity and internet protocol (IP) mobility in a heterogeneous network environment, the method comprising:
selecting, by a traffic distributing server, one of a first data path and a second data path for data traffic generated by a user equipment and received from a wireless local area network, based on path decision information associated with the received data traffic and based on a path decision policy obtained from at least one of entities of an associated mobile network;
transmitting the data traffic to Internet through the selected data path; and
changing the selected data path to the other based on updated path decision information,
wherein the first data path transmits the data traffic to Internet through a packet data network (PDN) gateway and the second data path transmits the data traffic to Internet without passing through the PDN gateway, and
wherein the path decision policy includes:
a policy rule to select one of the first data path and the second data path based on an application or a service generating the received WLAN data traffic from the user equipment;
a policy rule to select one of the first data path and the second data path based on a network load status of the first path;
a policy rule to select one of the first data path and the second data path based on subscriber information of the user equipment;
a policy rule to select one of the first data path and the second data path differently by a subscribing time; and
a policy rule to apply at least one of a priority and a weight for each path decision policy rule based on a subscribing time, a traffic generation region, a subscriber, a traffic type, and a load.

12. The method of claim 11, comprising:
monitoring a load status of the selected data path at a predetermined interval while transmitting the data traffic through the selected data path; and
changing the selected data path to the other when the monitored load stat of the selected data path is greater than a predetermined level.

13. The method of claim 11, comprising:
monitoring a load status of the PDN gateway at a predetermined interval while transmitting the data traffic through the first data path; and
changing the first data path to the second data path when the monitored load stat of the PDN gateway is greater than a predetermined level.

14. A traffic distributing server of distributing data traffic of a wireless local area network (WLAN) in a WLAN access network while providing service continuity and internet protocol (IP) mobility in a heterogeneous network environment, where the traffic distributing server includes at least one memory configured to store information and data for distributing data traffic, at least one communication circuit configured to communicate with other entities in an associated network, and at least one processor configured perform operations for distributing data traffic, the at least one of processor of the traffic distributing server configured to perform operations of:
receiving data traffic generated by a user equipment and from a wireless local area network;
obtaining a path decision policy from at least one of entities of an associated mobile network;
selecting one of a first data path and a second data path for the received data traffic based on path decision information associated with the received data traffic and based on the obtained path decision policy; and
transmitting the data traffic to Internet through the determined data path,
wherein the first data path transmits the data traffic to Internet through a packet data network (PDN) gateway and the second data path transmits the data traffic to Internet without passing through the PDN gateway, and
wherein the path decision policy includes:
a policy rule to select one of the first data path and the second data path based on an application or a service generating the received WLAN data traffic from the user equipment;
a policy rule to select one of the first data path and the second data path based on a network load status of the first path;
a policy rule to select one of the first data path and the second data path based on subscriber information of the user equipment;
a policy rule to select one of the first data path and the second data path differently by a subscribing time; and a policy rule to apply at least one of a priority and a weight for each path decision policy rule based on a subscribing time, a traffic generation region, a subscriber, a traffic type, and a load.

15. The traffic distributing server of claim 14, wherein the at least one processor of the traffic distributing server is configured to perform operations of:
    obtaining traffic information of the received data traffic, subscriber information of the user equipment, network information of entities in an associated mobile network, and a path decision policy; and
    storing the traffic information, the subscriber information, the network information, and the path decision policy, as the path decision information.

16. The traffic distributing server of claim 14, wherein the at least one processor of the traffic distributing server is configured to perform operations of:
    obtaining a load status of the PDN gateway as the network information;
    selecting the second data path when the obtained load status of the PDN gateway is greater than a predetermined load level; and
    selecting the first data path when the obtained load status of the PDN gateway is not greater than a predetermined load level.

17. The traffic distributing server of claim 14, wherein the at least one processor of the traffic distributing server is configured to perform operations of:
    obtaining traffic information from the received data traffic;
    extracting information on a source address, a destination address, a protocol, a source port, a destination port, and at least one of an application and a service executed in the user equipment from the received data traffic;
    comparing the extracted information with information stored in a mapping table;
    determining a data path mapped to information of the mapping table, which is matched with the extracted information; and
    selecting one of the first data path and the second data path based on the determined data path.

18. The traffic distributing server of claim 14, wherein the at least one processor of the traffic distributing server is configured to perform operations of:
    obtaining information on at least one of an application and a service executed in the user equipment from the received data traffic:
    selecting the first data path to transmit the received data traffic when the at least one of the application and the service generating the received data traffic is provided by an associated service provider that provides a mobile communication service through the PDN gateway;
    otherwise, selecting the second data path to transmit the data traffic.

* * * * *